US009215487B2

(12) United States Patent
Kasahara et al.

(10) Patent No.: US 9,215,487 B2
(45) Date of Patent: Dec. 15, 2015

(54) CONTROL DEVICE, IMAGE DISPLAY APPARATUS AND CONTROL METHOD

(75) Inventors: Daisuke Kasahara, Shiojiri (JP); Takashi Nagumo, Shiojiri (JP); Susumu Takatsu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 808 days.

(21) Appl. No.: 13/213,658

(22) Filed: Aug. 19, 2011

(65) Prior Publication Data
US 2012/0050239 A1 Mar. 1, 2012

(30) Foreign Application Priority Data

Aug. 25, 2010 (JP) .................. 2010-187804

(51) Int. Cl.
*G06F 15/16* (2006.01)
*G09G 5/10* (2006.01)
*G09G 5/02* (2006.01)
*H04R 29/00* (2006.01)
*B23K 11/24* (2006.01)
*H04N 3/27* (2006.01)
*H04N 5/00* (2011.01)
*H04N 5/44* (2011.01)
*H04N 5/74* (2006.01)
*G02F 1/00* (2006.01)
*H04N 21/41* (2011.01)
(Continued)

(52) U.S. Cl.
CPC .......... *H04N 21/4122* (2013.01); *G09G 5/003* (2013.01); *G09G 5/006* (2013.01); *H04N 9/3141* (2013.01); *H04N 21/43635* (2013.01); *H04N 21/44231* (2013.01); *G09G 2320/08* (2013.01); *G09G 2340/12* (2013.01); *G09G 2370/12* (2013.01); *G09G 2370/22* (2013.01)

(58) Field of Classification Search
CPC ............. G09G 2320/0233; G09G 2320/0626; G09G 2320/10; H04N 9/3185; H04N 9/3182; H04N 21/4854; H04N 2201/3274; H04N 5/7416; H04N 9/3173
USPC ........... 250/214.1; 340/426.16; 345/1.2, 157, 345/204, 660, 690, 698; 348/222.1, 441, 348/445, 618, 744; 353/69, 85, 88; 382/254; 396/429; 455/556.1; 700/19; 715/730; 718/1; 370/252; 381/59; 323/318
See application file for complete search history.

(56) References Cited

U.S. PATENT DOCUMENTS 6,396,542 B1 * 5/2002 Patel .............................. 348/445
6,922,202 B2 * 7/2005 Shigeta et al. ................ 345/698
(Continued)

FOREIGN PATENT DOCUMENTS

| CN | 101163181 A | 4/2008 |
| JP | 2007-140180 A | 6/2007 |
| JP | 2010-197633 A | 9/2010 |

*Primary Examiner* — Lin Li
(74) *Attorney, Agent, or Firm* — ALG Intellectual Property, LLC

(57) ABSTRACT

A control device includes: a digital signal input section through which a digital signal from an external device is input through a digital signal cable; a detecting section which detects connection with the external device and then outputs a detection signal to the external device; an adjusting section which performs adjustment for the digital signal; an information input section through which display request information about a setting image which receives input of setting information about the adjustment is input; and a control section which controls the detecting section not to output the detection signal if the display request information is input.

12 Claims, 8 Drawing Sheets

(51) Int. Cl.
*G09G 5/00* (2006.01)
*H04N 9/31* (2006.01)
*H04N 21/4363* (2011.01)
*H04N 21/442* (2011.01)

(56) References Cited

U.S. PATENT DOCUMENTS

| | | | |
|---|---|---|---|
| 7,969,455 B2* | 6/2011 | Yoshida et al. | 345/690 |
| 2006/0056446 A1 | 3/2006 | Lee et al. | |
| 2006/0215126 A1* | 9/2006 | Saito | 353/69 |
| 2007/0104112 A1* | 5/2007 | Sayers et al. | 370/252 |
| 2007/0165193 A1* | 7/2007 | Kubo et al. | 353/85 |
| 2007/0222896 A1* | 9/2007 | Oikawa | 348/725 |
| 2008/0084570 A1 | 4/2008 | Cho et al. | |
| 2008/0228986 A1 | 9/2008 | Lodolo | |
| 2009/0041257 A1* | 2/2009 | Yoshizawa et al. | 381/59 |
| 2009/0051816 A1* | 2/2009 | Ota | 348/618 |
| 2009/0109350 A1* | 4/2009 | Koyama | 348/759 |
| 2009/0307689 A1* | 12/2009 | Sudhakar | 718/1 |
| 2010/0073560 A1* | 3/2010 | Kitano et al. | 348/554 |
| 2010/0182234 A1* | 7/2010 | Takahashi et al. | 345/157 |
| 2010/0321395 A1* | 12/2010 | Maciesowicz et al. | 345/502 |
| 2011/0121810 A1* | 5/2011 | Tsai | 323/318 |

* cited by examiner

CONTROL DEVICE, IMAGE DISPLAY APPARATUS AND CONTROL METHOD

The entire disclosure of Japanese Patent Application No. 2010-187804 filed Aug. 25, 2010 is expressly incorporated by reference herein.

BACKGROUND

1. Technical Field

The present invention relates to a control device, an image display apparatus and a control method.

2. Related Art

In a state where an external device such as a DVD player and an image display apparatus such as a projector are connected with each other through a digital signal cable such as an HDMI cable, there is such a problem that no image is displayed, there is image flickering, noise is generated in a part of the image or the like, due to various causes. For example, such a problem occurs due to such a cause that the image display apparatus does not receive an image signal suitable for receiving performance of a receiving side, a copy protection function in the image display apparatus malfunctions, an image signal from the external device deteriorates in quality, the HDMI cable deteriorates in quality, or a receiving circuit of the image display apparatus does not have sufficient performance. For example, in JP-A-2007-140180, there is disclosed a projector which displays a user setting image regardless of a user's request, allows the user to set resolution or the like of the input image signal, updates setting data according to user setting information, and displays an image based on the image signal using the setting data, in a case where an image signal of which the type cannot be determined is input.

However, in the case of the method of displaying the user setting image regardless of the user's request, even though the type of the image signal may be appropriately determined, due to factors other than targets of a measuring section used for determining the signal type, for example, in a case where the image signal or the like cannot be normally received, there is such a problem that noise is generated in a part of the image, and thus, the image display apparatus may not display an appropriate image. Further, in the case of the method of displaying an image based on an input image signal and a user setting image to be overlapped, in a state where adjustment is not properly performed, the input image signal is in an unstable state and may or may not be normally received. Even though the input image signal is normally received, frequency of a sync signal becomes unstable, for example. Thus, the image display apparatus may not normally display even the user setting image, and a user may not adjust the user setting image. Further, for example, in a case where the HDMI cable is used, authentication according to HDCP (High-bandwidth Digital Content Protection) is performed. However, as the image display apparatus or the like performs the adjustment in a state where the authentication is successfully performed, an abnormal digital signal may be momentarily included in a signal which is a process target when an adjustment value is switched. Further, control or the like is performed on the basis of the abnormal signal, and thus, the image may not be appropriately displayed.

SUMMARY

An advantage of some aspects of the invention is to provide a control device, an image display apparatus and a control method which perform adjustment for a digital signal input through a digital signal cable.

A control device according to an aspect of the invention includes: a digital signal input section through which a digital signal from an external device is input through a digital signal cable; a detecting section which detects connection with the external device and then outputs a detection signal to the external device; an adjusting section which performs adjustment for the digital signal; an information input section through which display request information about a setting image which receives input of setting information about the adjustment is input; and a control section which controls the detecting section not to output the detection signal if the display request information is input.

According to one aspect of the invention, as the control device or the like can make the digital signal cable be virtually disconnected by controlling the detecting section not to output the detection signal when the display request information is input, it is possible to avoid HDCP false authentication or the like in an unstable state during adjustment. Thus, it is possible to appropriately perform adjustment for the digital signal input through the digital signal cable.

Further, according to one aspect of the invention, as the control device or the like can avoid HDCP false authentication or the like during display of the setting image, and can display the setting image in a more stable state, it is possible to appropriately perform adjustment for the digital signal input through the digital signal cable.

Further, according to the aspect, as the setting image is displayed in a state where the digital signal cable is disconnected, it is possible for a user to input the setting information regardless of deterioration of the digital signal or waveform quality due to noise or the like. Thus, it is possible to appropriately perform adjustment for the digital signal input through the digital signal cable.

Further, according to one aspect of the invention, it is possible to display the setting image according to the user's request.

Further, according to one aspect of the invention, it is possible to perform adjustment for the digital signal while preventing the user from mistakenly setting the setting value.

Further, according to one aspect of the invention, it is possible to appropriately perform adjustment for the digital signal by performing the equalizer adjustment.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments according to the invention, which are applied to a projector, will be described with reference to the accompanying drawings. The embodiments to be described below do not limit contents of the invention disclosed in the claims. Further, the entire configuration in the embodiments does not limit essential solutions of the invention disclosed in the claims.

First Embodiment

Figure 1:
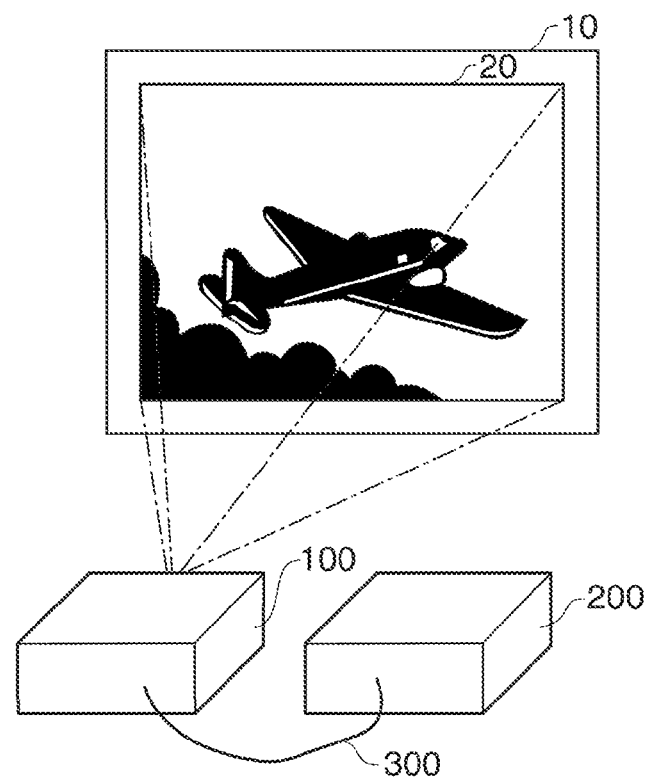
FIG. 1 is a diagram illustrating a projection status of a projector in a normal state according to a first embodiment.
Figure 2:
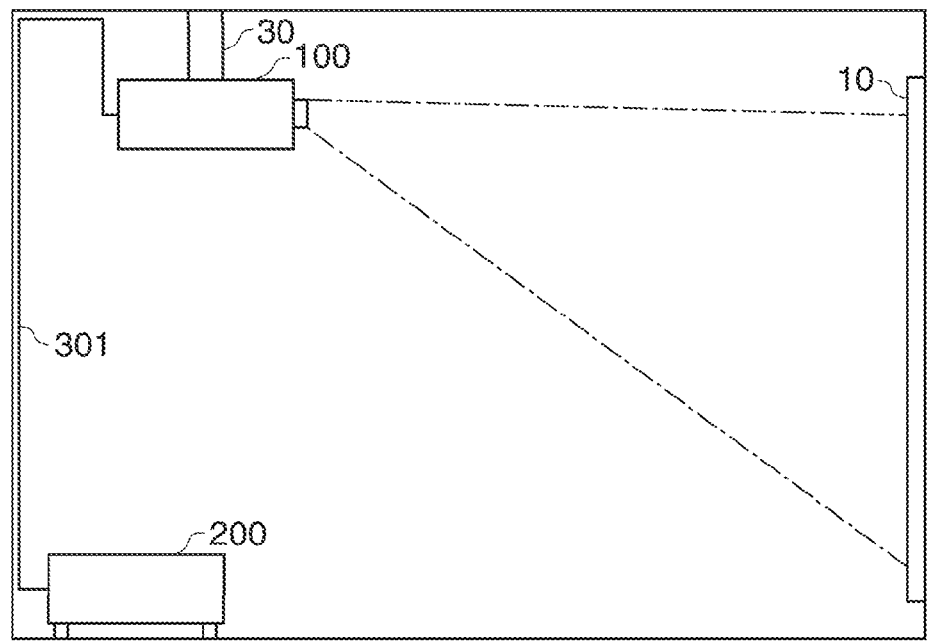
FIG. 2 is a diagram illustrating a projection status of a projector in a ceiling-mounted state according to a first embodiment.
Figure 3:
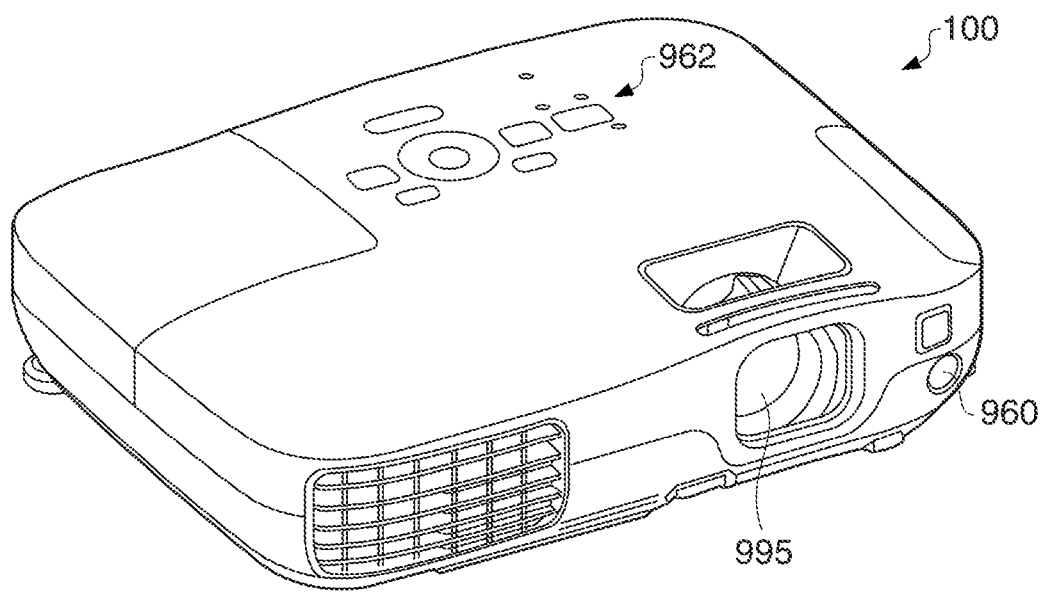
FIG. 3 is a perspective view illustrating a projector according to a first embodiment.
Figure 4:
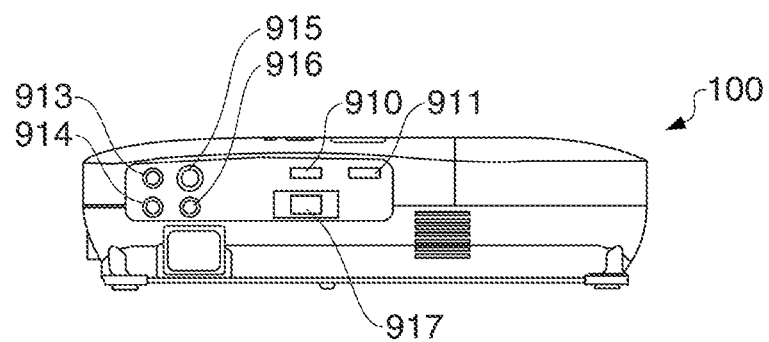
FIG. 4 is a rear view illustrating a projector according to a first embodiment.

FIG. 1 is a diagram illustrating a projection status of a projector 100 in a normal state according to a first embodiment. Further, FIG. 2 is a diagram illustrating a projection status of the projector 100 in a ceiling-mounted state according to the first embodiment. Further, FIG. 3 is a perspective view illustrating the projector 100 according to the first embodiment, and FIG. 4 is a rear view illustrating the projector 100 according to the first embodiment. The projector 100 is provided with HDMI connectors 910 and 911, sound input connectors 913 and 914, an S-video input connector 915, a video input connector 916, a mini D-Sub 15 pin connector 917, and the like on a rear side thereof. For example, as shown in FIG. 1, the projector (image display apparatus) 100 is connected to a DVD player (external device) 200 through an HDMI cable (digital signal cable) 300 connected to the HDMI connector 910 in a state of being disposed in a floor, a table or the like, and projects an image 20 on a screen 10 on the basis of an image signal (digital signal, for example, RGB signal, luminance color-difference signal, sync signal and the like) from the DVD player 200. On the other hand, as shown in FIG. 2, in the ceiling-mounted state where the projector 100 is fixed on a ceiling by a bracket 30, the length of the HDMI cable 301 becomes long compared with the normal state. Further, the HDMI cable 300 or 301 has various qualities or adaptive versions.

In this way, due to the influence of the length, quality or the like of the HDMI cable 300 or 301, a waveform quality of an image signal may be deteriorated by attenuation or the like of the image signal input to the projector 100, and thus the image 20 may not be appropriately displayed. In a case where the image 20 is not appropriately displayed, a user makes a request for the projector 100 to display a setting image for changing setting. However, since the setting image is an image displayed overlapped with an image based on the input image signal, in a state where the waveform quality of the image signal is deteriorated, the setting image is not also appropriately displayed. The projector 100 in this embodiment allows the HDMI cable 300 or 301 to be virtually disconnected, by stopping output of a hot plug detection signal at the time of displaying the setting image, and displays the setting image at this state. Further, if it is detected that the HDMI cable 300 or 301 is disconnected, the projector 100 in this embodiment displays the setting image. Then, a functional block of the projector 100 with such a function will be described.

Figure 5:
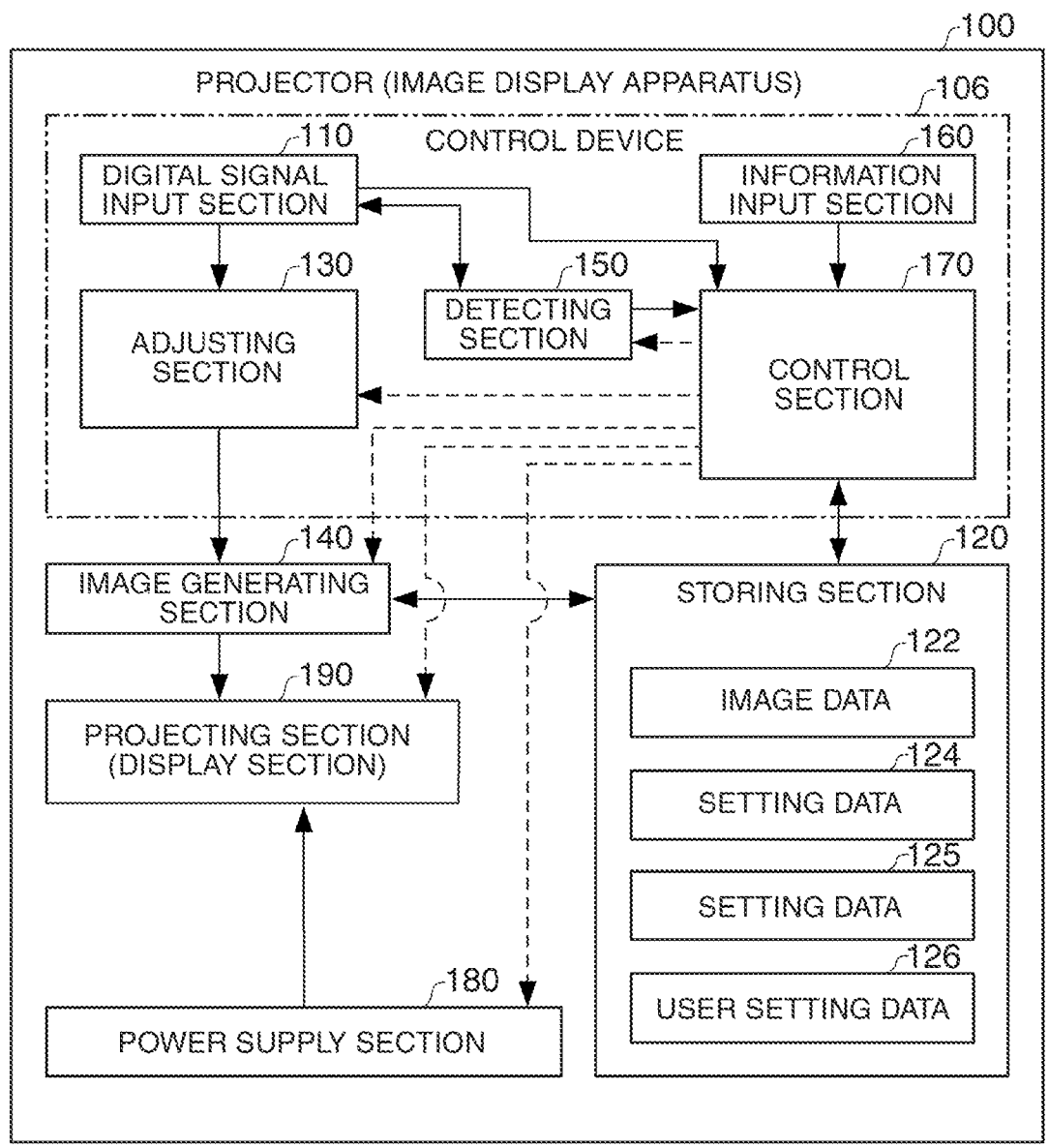
FIG. 5 is a functional block diagram illustrating a projector according to a first embodiment.

FIG. 5 is a functional block diagram illustrating the projector 100 according to the first embodiment. The projector 100 includes a digital signal input section 110 through which an image signal of a digital format is input through the HDMI cable 300 or 301, an adjusting section 130 which adjusts the image signal, an image generating section 140 which generates an image or the like based on the adjusted image signal, a projecting section (display section) 190 which projects the image or the like, a power supply section 180 which supplies electric power to the projecting section 190 or the like. Further, the projector 100 includes an information input section 160 through which operation information or the like is input by a user, a control section 170 which controls the adjusting section 130 or the like, a detecting section 150 which outputs the hot plug detection signal to the DVD player 200, and a storing section 120. Further, the storing section 120 stores image data 122 used for generating the setting image or the like, setting data 124 and 125 which indicate setting values of the adjusting section 130, and user setting data 126 which indicates user setting, and the like. The digital signal input section 110, the adjusting section 130, the detecting section 150, the information input section 160, the control section 170 function as a control device 106 which controls an output stop of the hot plug detection signal when the setting image is displayed.

Figure 6:
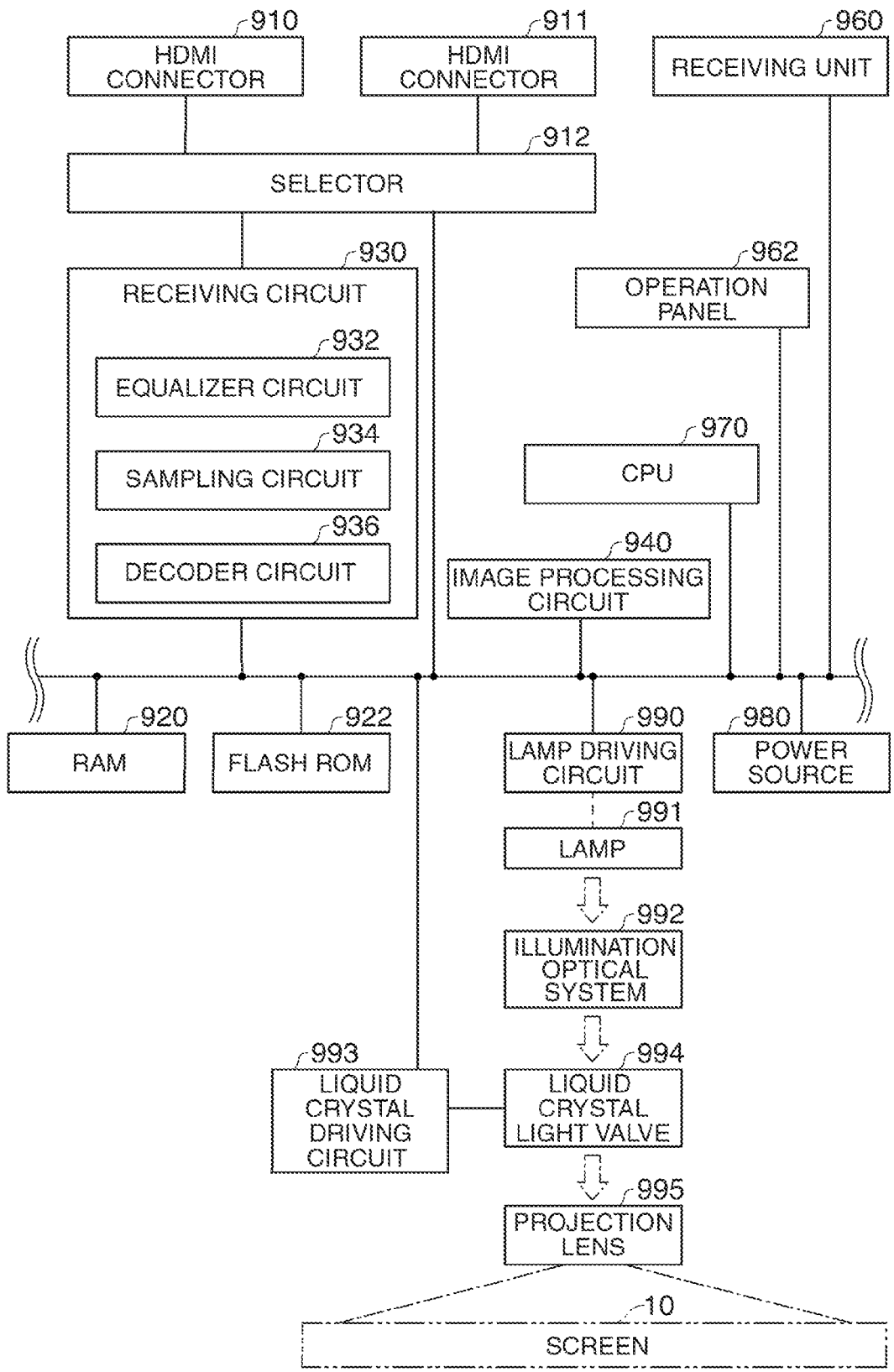
FIG. 6 is a hardware block diagram illustrating a projector according to a first embodiment.

FIG. 6 is a hardware block diagram illustrating the projector 100 according to the first embodiment, which schematically illustrates a connection status of respective sections. For example, the digital signal input section 110 may be mounted using HDMI connectors 910 and 911, a selector 912 or the like; the storing section 120 may be mounted using a RAM 920, a flash ROM 922 or the like; the adjusting section 130 may be mounted using a receiving circuit 930 or the like which includes an equalizer circuit 932, a sampling circuit 934, a decoder circuit 936 and the like; the image generating section 140 may be mounted using an image process circuit 940 or the like; the detecting section 150 and the control section 170 may be mounted using a CPU 970 or the like; the information input section 160 may be mounted using a receiving unit 960 which receives an infrared signal from a remote controller, an operation panel 962 having an operation button or the like, or the like; the power supply section 180 may be mounted using a power source 980 or the like; and the projecting section 190 may be mounted using a lamp driving circuit 990, a lamp 991, an illumination optical system 992, a liquid crystal driving circuit 993, a liquid crystal light valve 994, a projection lens 995 and the like. The lamp driving circuit 990 converts electric power from the power source 980 into driving power required for lighting the lamp 991 and outputs the driving power. In FIG. 6, for ease of description, a power supply line which supplies electric power to each section from the power source 980 is omitted. Further, in FIG. 6, only two HDMI connectors 910 and 911 are disclosed, but actually, the projector 100 has different connectors such as an S-video input connector 915. Further, the HDMI connectors 910 and 911 may be provided as a single connector.

Figure 7:
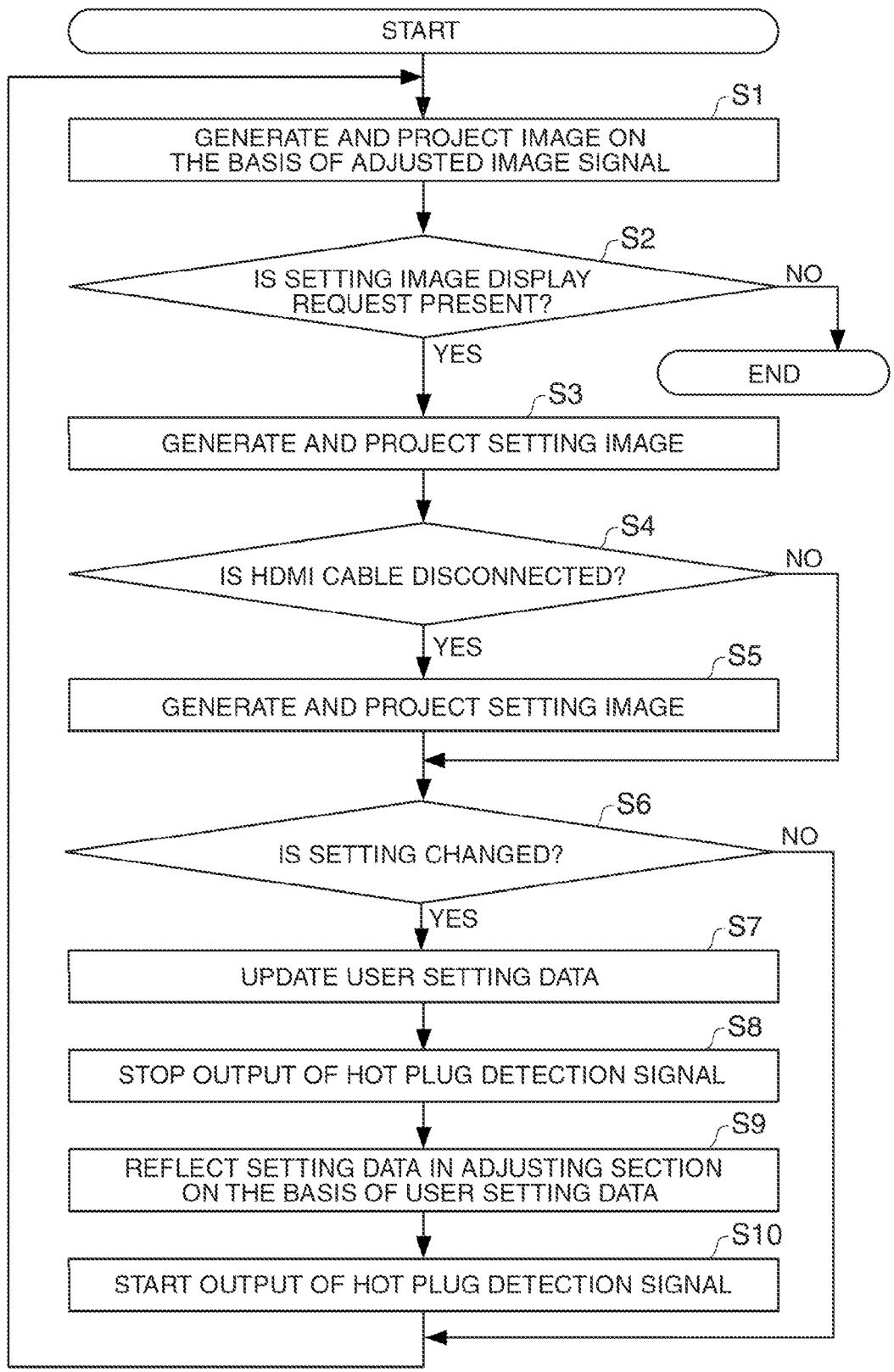
FIG. 7 is a flowchart illustrating an image display routine according to a first embodiment.

Next, an image display routine in this embodiment will be described. FIG. 7 is a flowchart illustrating an image display routine in the first embodiment. The image generating section 140 generates the image 20 on the basis of an image signal adjusted by the adjusting section 130, and the projecting section 190 projects the image 20 (step S1). For example, in a case where it is determined that noise is generated in a part of the projected image 20, a user operates the operation panel 962 of the projector 100 or the remote controller (not shown) to make a request for setting image display. The operation panel 962 and the remote controller include arrow keys corresponding to up and down and left and right directions required for adjustment or selection of various setting items in a setting image which will be described later, a determination key, and the like. The control section 170 determines whether the setting image display request is made or not on the basis of information (display request information by the user) from the information input section 160 (step S2). In a case where there is no setting image display request, since the image is normally displayed, the projector 100 terminates a process for an initial control and performs a normal image process. In a case where there is the setting image display request, the control section 170 controls the image generating section 140 to generate a setting image based on the image data 122. The projecting section 190 projects the setting image (step S3).

Figure 8:
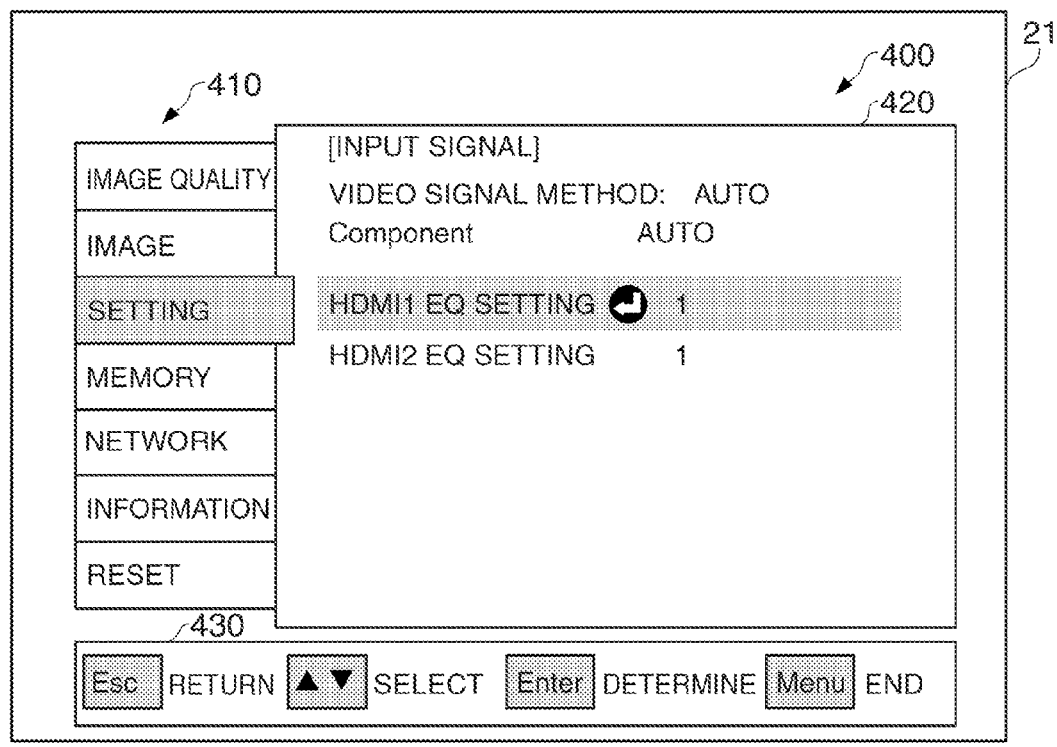
FIG. 8 is a diagram illustrating an example of a setting image according to a first embodiment.
Figure 9:
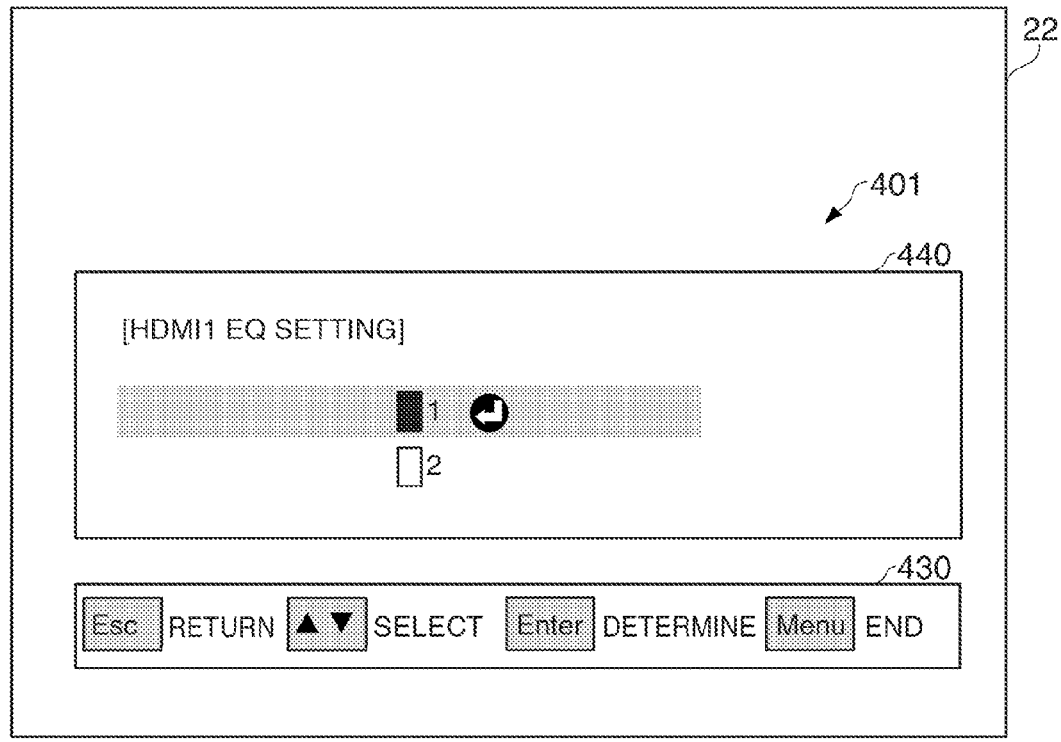
FIG. 9 is a diagram illustrating another example of a setting image according to a first embodiment.

FIG. 8 is a diagram illustrating an example of a setting image 400 according to the first embodiment. FIG. 9 is a diagram illustrating another example of a setting image 401 according to the first embodiment. The setting image 400 or 401 receives input of setting information from the user. For example, the setting image 400 includes a top menu image 410 including options such as "quality", "video", "setting", "memory", "network", "information" and "reset", a sub menu image 420 relating to an input signal displayed when "input signal" is selected from "setting", and an operation guide image 430 indicating a key operation of the operation panel 962 or the remote controller and a response content of the key operation. Further, the setting image 401 is a selection image which receives selection of the setting data 124 and 125. The setting image 401 is an image displayed when "HDMI1 EQ setting" or "HDMI2 EQ setting" is selected from the sub menu image 420, and includes an equalizer setting image 440 and an operation guide image 430.

"HDMI1 EQ setting 1" indicates that a setting 1 corresponding to the setting data 124 as equalizer setting (digital signal adjustment) for an input signal through the HDMI connector 910 is selected, and "HDMI2 EQ setting 1" indicates that a setting 1 corresponding to the setting data 124 as equalizer setting for an input signal through the HDMI connector 911 is selected. For example, in a state where the setting image 401 shown in FIG. 9 is displayed, the user can press the operation panel 962 or the down arrow key of the remote controller to select a setting 2 and can press the operation panel 962 or a menu key of the remote controller for termination, to thereby change the equalizer setting for the HDMI connector 910 into the setting 2. The setting image 400 or 401 is an OSD (On Screen Display) image. The setting image 400 is displayed as an OSD image of the image 21, and the setting image 401 is displayed as an OSD image of the image 22.

Further, after the setting image 400 is generated, the control section 170 determines whether the HDMI cable 300 or 301 is disconnected from the HDMI connector 910 or 911 on the basis of information from the digital signal input section 110 (step S4). For example, by detecting that a TMDS (Transition Minimized Differential Signaling) signal is not input to the digital signal input section 110, the control section 170 may determine that the HDMI cable 300 or 301 is disconnected from the HDMI connector 910 or 911.

However, there is no problem in a case where the setting image 400 is appropriately displayed, but the setting image 400 may not be displayed in spite of the projection of the setting image 400 in step S3. In such a case, the user allows the projector 100 to project the setting image 400 by disconnecting the HDMI cable 300 or 301 from the HDMI connector 910 or 911, without the influence of the input image signal.

When the HDMI cable 300 or 301 is disconnected from the HDMI connector 910 or 911, the control section 170 controls the image generating section 140 to generate the setting image 400 based on the image data 122, without the influence of the input image signal. The projecting section 190 projects the setting image 400 (step S5).

In a state where the setting image 401 is displayed by the process in step S3 or step S5, the control section 170 determines whether the setting is changed on the basis of the information from the information input section 160 (step S6). In a case where the setting is changed, the control section 170 updates the user setting data 126 (step S7). Specifically, for example, in a state where the setting image 401 shown in FIG. 9 is displayed, in a case where the user presses the operation panel 962 or the down arrow key of the remote controller to select the setting 2 and presses the operation panel 962 or the menu key of the remote controller to perform a termination operation, the control section 170 updates the user setting data 126 so that the setting data 125 is applied to the HDMI connector 910.

After the user setting data 126 is updated, the control section 170 controls the detecting section 150 to stop the output of the hot plug detection signal (step S8). The hot plug detection signal is a signal according to the HDMI standard, which is output by the projector 100 according to an electric power signal from the DVD player 200. The control section 170 refers to the setting data 124 or the setting data 125 according to setting indicated by the user setting data 126, applies the data to the adjusting section 130, and adjusts the input image signal from the digital signal input section 110 (step S9). For example, the setting data is a gain value or the like in the equalizer circuit 932.

After the application of the setting data is terminated, the control section 170 controls the detecting section 150 to restart output of the hot plug detection signal (step S10). Thus, the projector 100 facilitates re-output of an image signal from the external device such as a DVD player 200, allows the adjusting section 130 to adjust the input image signal on the basis of the setting data 124 or the setting data 125 which is newly applied, and re-generates and projects the image 20.

As described above, according to this embodiment, as the projector 100 controls the detecting section 150 to receive the display request information, to change the setting applied to the adjusting section 130, and not to output the hot plug detection signal, it is possible to make the HDMI cable 300 or 301 be virtually disconnected, and to avoid an HDCP false authentication or the like in an unstable state during adjustment. Thus, it is possible to appropriately perform the adjustment for the digital signal input through the digital signal cable in a more stable state.

Further, according to this embodiment, since the projector 100 can display the setting images 400 and 401 according to the request from the user, even in a case where it cannot be determined whether the projector 100 performs an appropriate display, it is possible to display an appropriate image by the user.

Further, according to this embodiment, as the projector 100 displays the setting image 401 for setting selection to be selected, it is possible to perform adjustment for the digital signal, while preventing the user from mistakenly selecting the setting value. Further, according to this embodiment, the projector 100 can appropriately perform adjustment for the digital signal by performing the equalizer adjustment.

Further, according to this embodiment, even in a state where the HDMI cable 300 or 301 having various lengths is connected, the projector 100 can perform adjustment suitable for the length or quality to display the image 20. Further, according to this embodiment, the projector 100 can perform adjustment according to characteristics of the HDMI connectors 910 and 911 or the receiving circuit 930.

Second Embodiment

In the first embodiment, the projector 100 stops the output of the hot plug detection signal, but may not stop the output of the hot plug detection signal. Further, in the first embodiment, the projector 100 detects that the HDMI cable 300 or 301 is disconnected and projects the setting image 400, but may project the setting image 400 without the detection.

Figure 10:
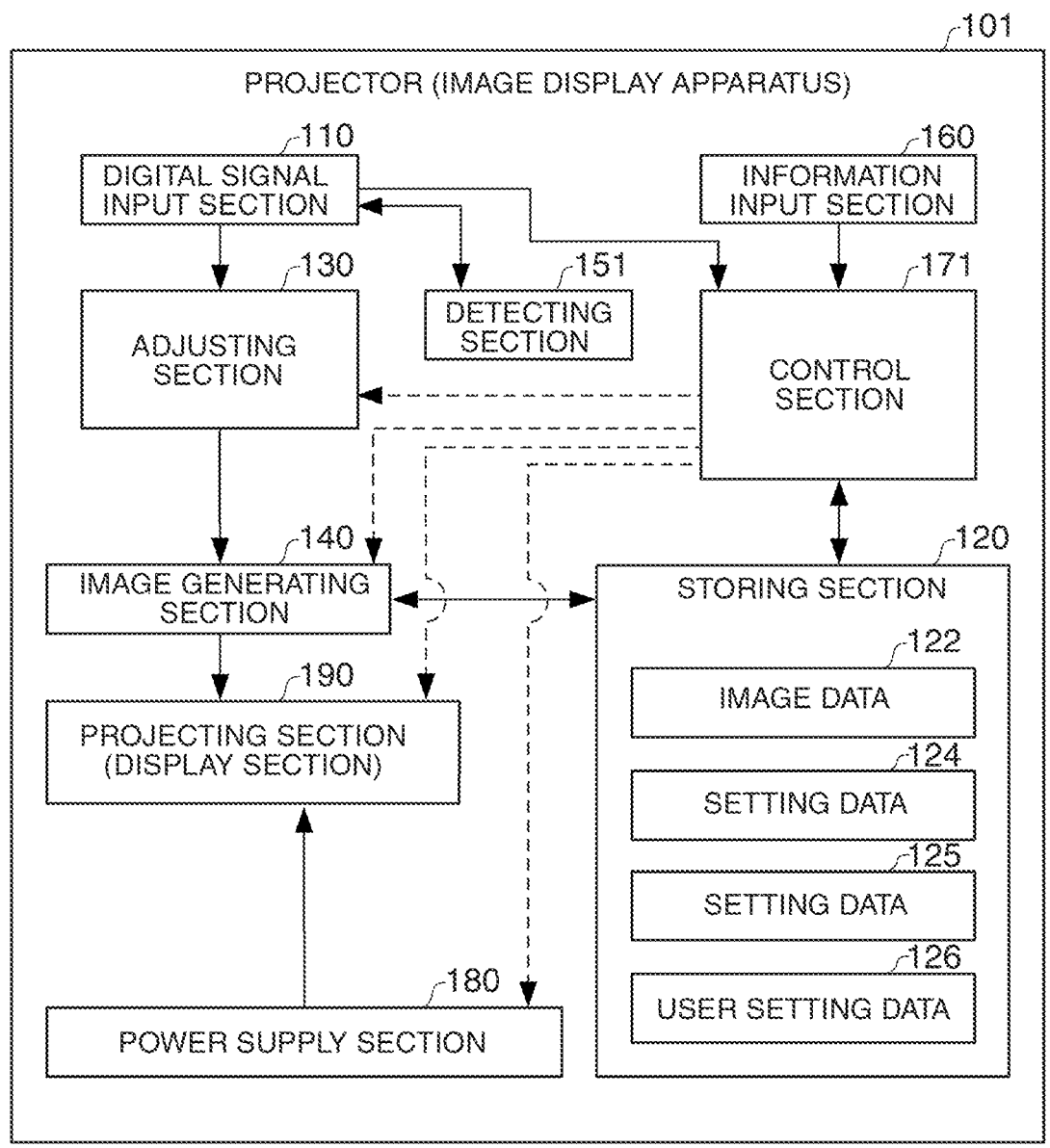
FIG. 10 is a functional block diagram illustrating a projector according to a second embodiment.

FIG. 10 is a functional block diagram illustrating a projector 101 according to a second embodiment. The projector 101 includes a detecting section 151 and a control section 171 which does not control the detecting section 151. Since a configuration except for the detecting section 151, the control section 171 is the same as that of the first embodiment, its description will be omitted.

Figure 11:
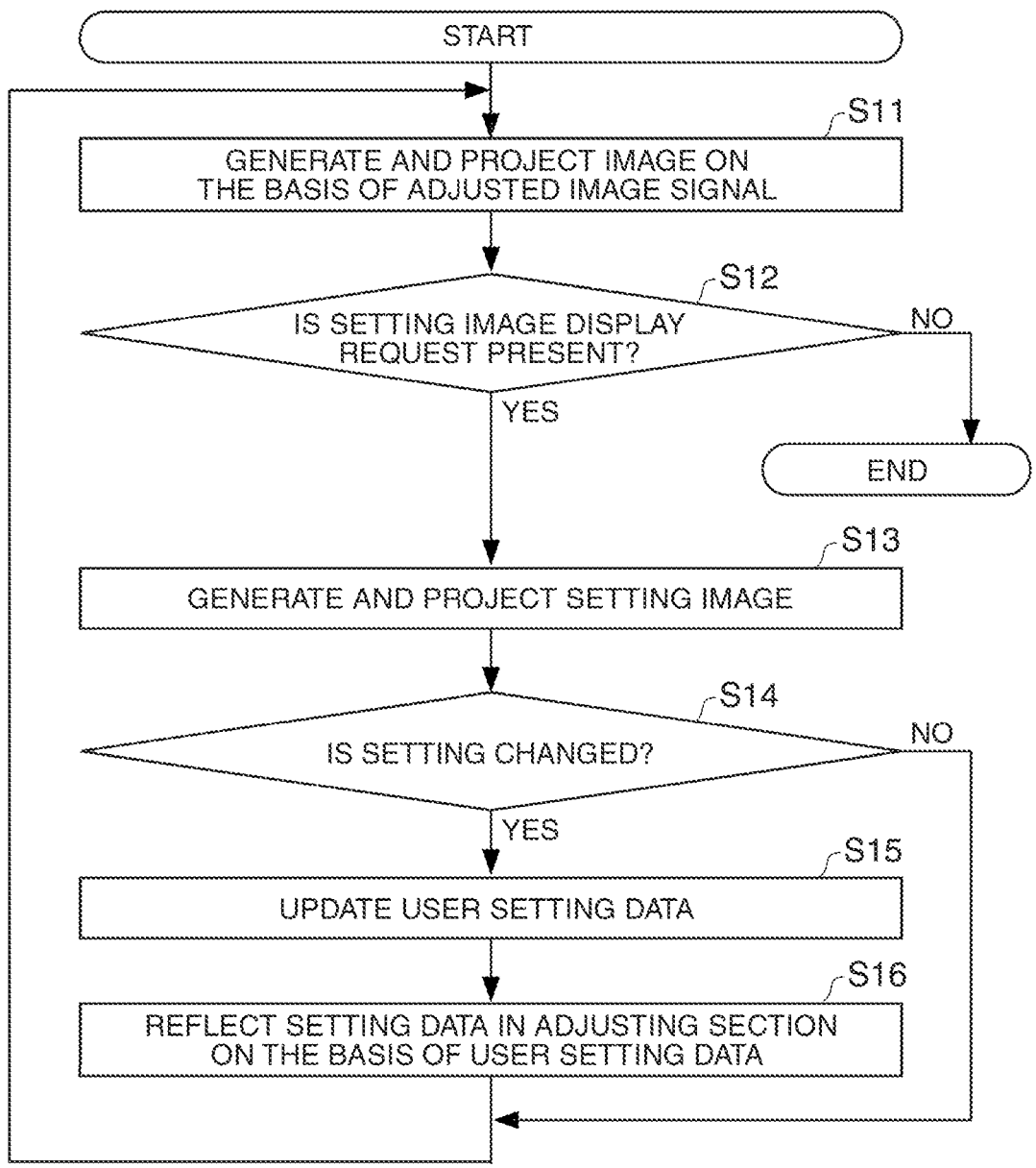
FIG. 11 is a flowchart illustrating an image display routine according to a second embodiment.

FIG. 11 is a flowchart illustrating an image display routine according to the second embodiment. The image generating section 140 generates the image 20 on the basis of an image signal adjusted by the adjusting section 130, and the projecting section 190 projects the image 20 (step S11). The control section 171 determines whether a display request of the setting image 400 is made on the basis of information from the information input section 160 (step S12). In a case where the display request of the setting image 400 is present, the control section 171 controls the image generating section 140 to generate the setting image 400, and the projecting section 190 projects the setting image 400 (step S13).

In a state where the setting image 401 is displayed, the control section 171 determines whether the setting is changed on the basis of the information from the information input section 160 (step S14). When the setting is changed, the control section 171 updates the user setting data 126 (step S15). The control section 171 controls the adjusting section 130 with reference to the setting data 124 or the setting data 125 according to the setting indicated by the user setting data 126, and adjusts an input image signal from the digital signal input section 110 (step S16).

As described above, according to this embodiment, as the projector 101 displays the setting images 400 and 401 which receive the setting information relating to adjustment of the digital signal, regardless of the presence or absence of the digital signal input, it is possible to allow the user to input setting information regardless of deterioration of the digital signal or waveform quality due to noise or the like. Thus, it is possible to appropriately perform adjustment for the digital signal input through the digital signal cable.

Other Embodiments

Application of the invention is not limited to the above-described embodiments. For example, the digital signal cable is not limited to the HDMI cable 300 or 301, but may be a DVI (Digital Visual Interface) cable or the like. Further, the digital signal is not limited to the image signal, but may be a sound signal or a signal including the image signal and the sound signal. Further, items set in the setting images 400 and 401 are not limited to the setting of the equalizer circuit 932, but may be parameter values or the like other than the equalizer circuit 932 of the receiving circuit 930. Further, a setting image which receives parameter values or the like from a user may be employed.

Further, a method of detecting that the HDMI cable 300 or 301 is disconnected is not limited to the above-described method, but for example, may be a method of detecting physical contact in the HDMI connectors 910 and 911, or the like. Further, the image display apparatus is not limited to the projectors 100 and 101, but for example, may be a television, a liquid crystal display monitor, or the like. Further, the apparatus which is installed with the control device 106 is not limited to the image display apparatus, but for example, may be a hard disk recorder, a set-top box, an AV amplifier, or the like. Further, the external device is not limited to the DVD player 200, but for example may be a hard disk recorder, a set-top box, a PC (Personal Computer), a game device, or the like.

Further, the computer included in the projector 100 or 101 may read a program stored in an information storage medium to function as the control section 170 or the like. As such an information storage medium, for example, a CD-ROM, DVD-ROM, ROM, RAM, HDD, or the like may be applied.

Further, the projector is not limited to the liquid crystal projector (transmission type or reflection type), but for example, may be a projector using a digital micro mirror device. Further, the projecting section may employ a self emission device including a solid light source such as an organic EL device, a silicon light emitting device, a laser diode or an LED instead of a lamp. Further, the functions of the projector may be separately allocated to a plurality of devices (for example, PC, projector and the like).

What is claimed is:

1. An image display apparatus comprising:
   a digital signal input section through which a digital signal from an external device is input through a digital signal cable;
   a detecting section which detects connection with the external device and then outputs a detection signal to the external device;
   an adjusting section which performs adjustment for the digital signal;
   a storing section that stores image data for generating a setting image which receives an input of setting information about the adjustment;
   an information input section through which a display request information about a requesting display of the setting image is input;
   a display section which displays the setting image and displays an image on the basis of the digital signal; and
   a control section which controls the detecting section to stop output of the detection signal,
   wherein, when the display request information is input when the digital signal cable is disconnected from the digital signal input, the display section displays the setting image generated from the image data in the storing section without the influence of the digital signal, and
   when the display request information is input when the digital signal cable is connected to the digital signal input, the control section controls the detecting section to stop output of the detection signal in response to the display request information being input so as to virtually disconnect the digital signal cable from the image display apparatus while still maintaining a physical connection between the digital signal cable and the image display apparatus.

2. The image display apparatus according to claim 1, wherein the control section controls the detecting section not to output the detection signal during the adjustment of the adjusting section, and controls the detecting section to output the detection signal if the adjustment of the adjusting section is completed.

3. The image display apparatus according to claim 1, wherein the control section displays the setting image on the display section regardless of the presence or absence of the digital signal input, if it is detected that the digital signal cable is disconnected from the image display apparatus.

4. The image display apparatus according to claim 1, wherein the display section displays the setting image according to the input of the display request information.

5. The image display apparatus according to claim 1,
further comprising a storing section which stores a plurality of pieces of setting data having a different setting value,
wherein the setting image includes a selection image which receives a selection of the setting data as the input of the setting information, and
wherein the adjusting section performs the adjustment for the digital signal on the basis of the setting value of the selected setting data.

6. The image display apparatus according to claim 1, wherein the adjusting section performs an equalizer adjustment.

7. An image display apparatus according to claim 1,
wherein when an equalizer adjustment image is displayed in a state where the image display apparatus is connected with the external device through an HDMI cable, the output of the connection detection signal is stopped to maintain a state where the HDMI cable is virtually disconnected.

8. The image display apparatus according to claim 7,
wherein an equalizer adjustment is performed, without causing a display trouble due to an authentication error or a transitional abnormal reception, by displaying the equalizer adjustment image in a state where the HDMI cable is virtually disconnected.

9. A control method for an image display apparatus which includes a digital signal input section through which a digital signal from an external device is input through a digital signal cable, a detecting section which detects connection with the external device and then outputs a detection signal to the external device, an adjusting section which performs adjustment for the digital signal, a storing section that stores image data for generating a setting image which receives an input of setting information about the adjustment, a control section which controls the detecting section to stop output of the detection signal and a display section which displays the setting image and displays an image on the basis of the digital signal, the method comprising:
receiving display request information requesting display of the setting image; and
displaying the setting image,
wherein, when the display request information is input when the digital signal cable is disconnected from the digital signal input, the display section displays the setting image generated from the image data in the storing section without the influence of the digital signal, and
when the display request information is input when the digital signal cable is connected to the digital signal input, the control section controls the detecting section to stop output of the detection signal in response to the display request information being input so as to virtually disconnect the digital signal cable from the image display apparatus while still maintaining a physical connection between the digital signal cable and the image display apparatus before displaying the setting image.

10. The control method according to claim 9,
wherein the detecting section is controlled not to output the detection signal during the adjustment of the adjusting section, and the detection signal is output if the adjustment of the adjusting section is completed.

11. The control method according to claim 9,
wherein the setting image is displayed on the display section regardless of the presence or absence of the digital signal input, if it is detected that the digital signal cable is disconnected from the image display apparatus.

12. A control device comprising:
digital signal input means through which a digital signal from an external device is input through a digital signal cable;
detecting means for detecting connection with the external device and then outputs a detection signal to the external device;
adjusting means for performing adjustment for the digital signal;
storing means for storing image data for generating a setting image which receives an input of setting information about the adjustment;
information input means through which a display request information requesting display of the setting image is input;
a display means which displays the setting image, and displays an image on the basis of the digital signal; and
control means for controlling the detecting means to stop output of the detection signal,
wherein, when the display request information is input when the digital signal cable is disconnected from the digital signal input means, the display means displays the setting image generated from the image data in the storing means without the influence of the digital signal, and
when the display request information is input when the digital signal cable is connected to the digital signal input means, the control means controls the detecting means to stop output of the detection signal in response to the display request information being input so as to virtually disconnect the digital signal cable from the image display apparatus while still maintaining a physical connection between the digital signal cable and the image display apparatus.

* * * * *